March 25, 1930. F. G. LANDWEHR 1,751,824
PROPELLING MEANS FOR AIRSHIPS
Filed Aug. 10, 1929    2 Sheets-Sheet 1
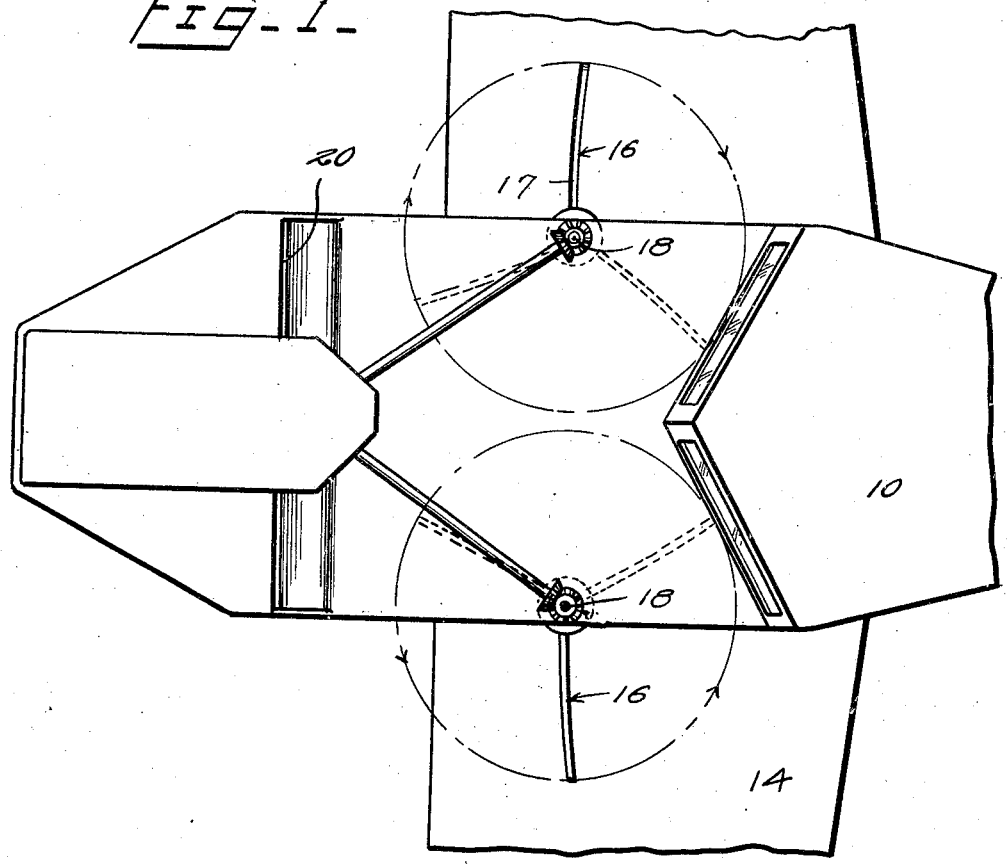
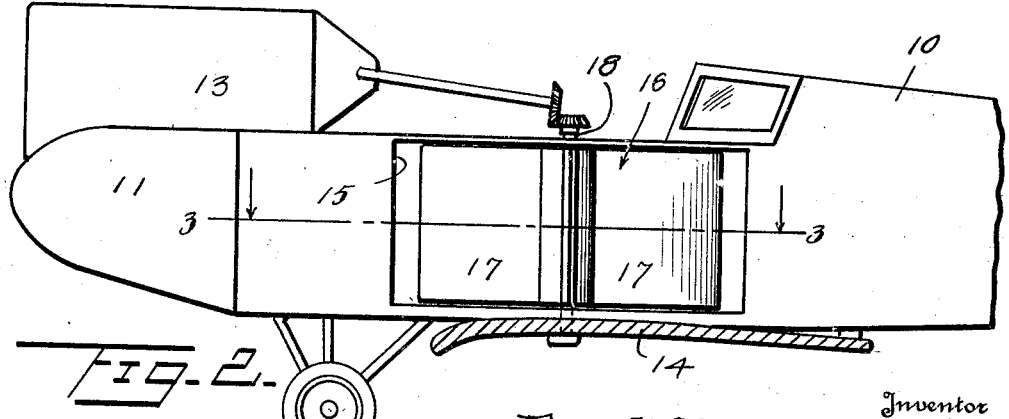
Inventor
Frank G. Landwehr
By Watson E. Coleman
Attorney

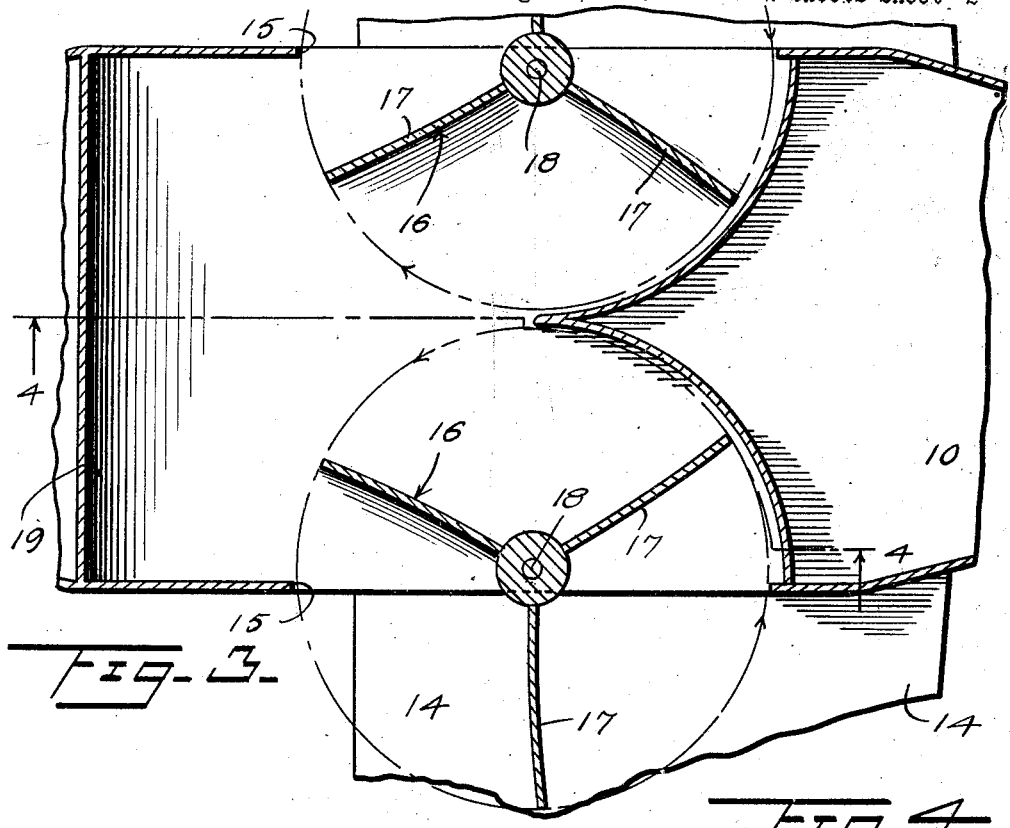
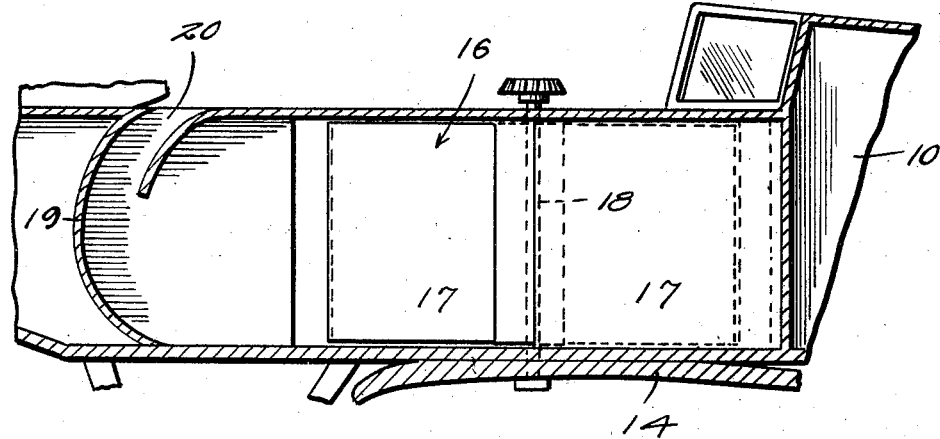

Patented Mar. 25, 1930

1,751,824

UNITED STATES PATENT OFFICE

FRANK G. LANDWEHR, OF DETROIT, MICHIGAN

PROPELLING MEANS FOR AIRSHIPS

Application filed August 10, 1929. Serial No. 384,892.

This invention relates to aircraft of the heavier-than-air type, and particularly to the propelling means therefor.

One of the objects of the present invention is to provide propellers mounted on each side of the fuselage adjacent the nose of the plane, these propellers having vanes or paddles and being driven in a horizontal plane by the engines of the airship, the propellers being so arranged that the axes thereof are disposed adjacent the edge of the fuselage.

A further object is to provide means taking care of the air which is sucked by these rotating propellers into the fuselage and which is, therefore, forced forward in the fuselage by providing for the impingement of said air against the forward end of the fuselage and the escape of the air above the upper surface of the fuselage.

Another object is to provide a mechanism of this character in which the propellers operate closely adjacent to and over the upper faces of the wings so as to create a reduced air pressure above these wings.

Other objects will appear in the course of the following description.

My invention is illustrated in the accompanying drawings, wherein:—

Figure 1 is a top plan view of an airplane, having my propelling means mounted thereon;

Figure 2 is a side elevation thereof;

Figure 3 is a sectional view on the line 3—3 of Figure 2;

Figure 4 is a section on the line 4—4 of Figure 3.

Referring to these drawings, 10 designates the fuselage of an airplane of any suitable type or construction and having the usual nose 11, the landing gear 12, and having its motor 13 mounted upon the top of the fuselage, though the motor might be mounted in any other suitable position.

As illustrated, the sustaining plane or wing of the machine 14 extends across the fuselage immediately beneath the same, this wing having the usual form of airplane wings or being of any other suitable character. The wing is shown as being disposed just rearward of the landing wheels 12. Immediately above the wing, the fuselage is cut away at 15, and mounted in the fuselage so as to be projected through the openings 15 are the rotatable propellers 16, each having a plurality of slightly curved vanes or blades 17. While I do not wish to be limited to the exact number, preferably there are three of these vanes or blades for each propeller. Each propeller is mounted upon a vertical shaft 18 and these shafts are designed to be driven from the engine in any suitable manner which I will describe later.

The forward end of the fuselage, it will be seen, is upwardly rounded, as at 19, and opens upon the upper surface of the fuselage through an opening 20. It will be seen, therefore, that when the propellers are rotated in the direction of the arrow in Figure 1 that they will act to propel the machine through the air, and that while most of the air will be forced directly backward, which air will tend to flow closely adjacent to the rearwardly contracted or convergent side surfaces of the fuselage, some of the air will be drawn into the fuselage and then forced forward by the blades striking against the rounded inner surface 19 of the nose of the fuselage and being discharged upward to the upwardly and rearwardly extending opening 20. This air so discharged will tend to move upward and rearward, giving a forward impulse to the plane by its reaction and also acting to lessen or reduce the air pressure on the top of the plane, thus increasing the lifting action of the plane.

The movement of the propellers 16 over the upper faces of the wings 14 will also tend to reduce the air pressure above these wings so that the static pressure acting below the wings will assist in lifting the plane. Thus the wings will not only have the usual reduced pressure above the wings because of the angle of incidence and the camber of the wings, but the air will also be carried away constantly from the top of the wings to reduce the pressure of the air above the wings.

While I do not wish to be limited to the exact number of blades on the propeller, I preferably use a three-bladed propeller as being much more efficient than a four-bladed propeller as because of the suction on the rear side of the blades as they revolve at high speed they would have a tendency to create a vacuum and, being near together, would not allow as much air to pass into the blades. There are two movements of the air with my construction. The air on the outside of the fuselage is drawn inward by the blades of the propellers and thrown rearward. A certain amount of air, however, is carried into the fuselage and thrown forward against the curved surface of the nose of the fuselage and is sucked up on the top by the air exterior of the plane as the plane races by. By throwing the air forward against the upwardly curved nose of the fuselage and directing the air upward and rearward, a steady forward thrust is created. When the blades move outward beyond the fuselage and then rearward, they exert a direct thrust upon the air to urge the machine forward.

I claim:—

1. An airship including a fuselage, wings supporting the fuselage, rotatable propellers mounted upon vertical axes on each side of the fuselage, the fuselage being open to accommodate said propellers, a motor, and means for driving the propellers from the motor, the forward end of the fuselage being upwardly and rearwardly curved to receive the impact of air drawn into the interior of the fuselage by said propellers and forced forward therein, the fuselage above the forward end having an opening through which the air is discharged.

2. An airship including a fuselage having an upwardly and rearwardly rounded forward end, the sides of the fuselage rearward of said forward end having openings, vertical shafts mounted in the fuselage and extending across said openings, propeller blades mounted upon said shafts and rotatable in a horizontal plane with the shafts and having a width approximately equal to the width of said openings, a sustaining wing mounted upon the fuselage below the same and extending outward on each side below the propellers, the top of the fuselage having an opening through which air is discharged by reflection from the rounded surface of the nose of the fuselage.

3. An airship including a fuselage having an upwardly and rearwardly rounded forward end, the sides of the fuselage rearward of said forward end having openings, vertical shafts mounted in the fuselage and extending across said openings, propeller blades mounted upon said shafts and rotatable in a horizontal plane with the shafts and having a width approximately equal to the width of said openings, and a sustaining wing mounted upon the fuselage below the same and extending outward on each side below the propellers, the top of the fuselage having an opening through which air is discharged by reflection from the rounded surface of the nose of the fuselage, each propeller having but three blades.

In testimony whereof I hereunto affix my signature.

FRANK G. LANDWEHR.